United States Patent [19]
Thomas et al.

[11] Patent Number: 6,045,172
[45] Date of Patent: Apr. 4, 2000

[54] PICK-UP TRUCK BED EXTENDING DEVICE

[76] Inventors: John Joseph Thomas, 2303 Center St.;
Patsy Oliveto, 2907 Brentwood Ave.,
both of Moundsville, W. Va. 26041

[21] Appl. No.: 09/082,688

[22] Filed: May 21, 1998

[51] Int. Cl.$^7$ ................................................ B62D 33/023
[52] U.S. Cl. ............................ 296/26.1; 414/522; 108/44
[58] Field of Search ............................ 296/26.08, 26.09,
296/26.11, 26.1, 57.1, 58–60, 61; 224/403–405;
414/522, 537; 108/44

[56] References Cited

U.S. PATENT DOCUMENTS

| | | | |
|---|---|---|---|
| 327,830 | 10/1885 | Skiles | 296/58 |
| 2,471,730 | 5/1949 | Doerr | 108/44 |
| 4,624,619 | 11/1986 | Uher | 414/537 |
| 5,478,130 | 12/1995 | Matulin et al. | 296/57.1 |
| 5,868,449 | 2/1999 | Hitchcock | 296/26.1 |

*Primary Examiner*—Dennis H. Pedder

[57] ABSTRACT

A new pick-up truck bed extending device for enabling extended loads to be safely and securely hauled. The inventive device includes a cover member secured to a tailgate of a pick-up truck. An extension panel is slidably received within the open outer end of the cover member. A first pair of elongated braces are pivotally coupled with the extension panel. Free ends of the braces have an aperture therethrough. A second pair of elongated braces are pivotally coupled with opposing interior walls of the pick-up inwardly of the tailgate. Free ends of the braces have an aperture therethrough for aligning with the apertures of the first pair of elongated braces for receiving fasteners when the extension panel is in a fully extended orientation.

4 Claims, 3 Drawing Sheets

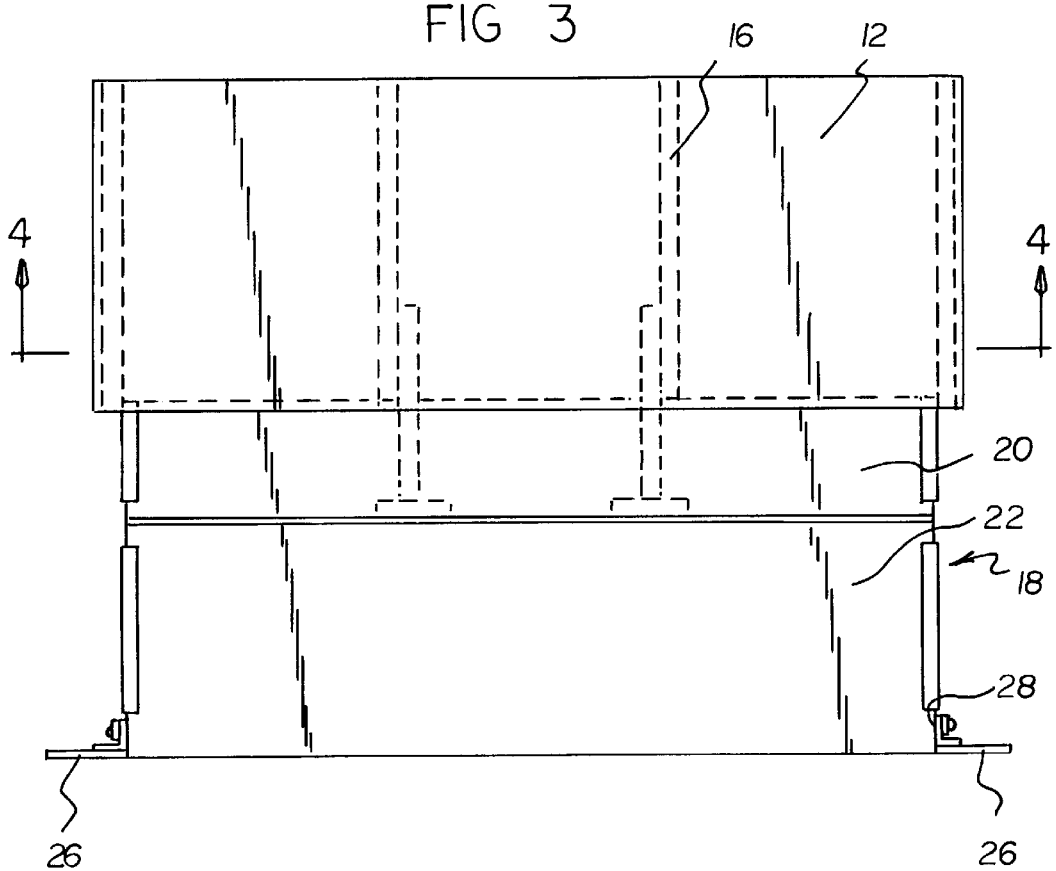

PICK-UP TRUCK BED EXTENDING DEVICE

BACKGROUND OF THE INVENTION

1. Field of the Invention

The present invention relates to tailgate assemblies and more particularly pertains to a new pick-up truck bed extending device for enabling extended loads to be safely and securely hauled.

2. Description of the Prior Art

The use of tailgate assemblies is known in the prior art. More specifically, tailgate assemblies heretofore devised and utilized are known to consist basically of familiar, expected and obvious structural configurations, notwithstanding the myriad of designs encompassed by the crowded prior art which have been developed for the fulfillment of countless objectives and requirements.

Known prior art tailgate assemblies include U.S. Pat. No. 5,133,584 to McCleary; U.S. Pat. No. 4,735,454 to Bernard; U.S. Pat. No. 5,169,202 to Cupp et al.; U.S. Pat. No. 4,531,773 to Smith; U.S. Pat. No. 4,778,213 to Palmer: and U.S. Pat. No. Des. 291,789 to Noga.

While these devices fulfill their respective, particular objectives and requirements, the aforementioned patents do not disclose a new pick-up truck bed extending device. The inventive device includes a cover member secured to a tailgate of a pick-up truck. An extension panel is slidably received within the open outer end of the cover member. A first pair of elongated braces are pivotally coupled with the extension panel. Free ends of the braces have an aperture therethrough. A second pair of elongated braces are pivotally coupled with opposing interior walls of the pick-up inwardly of the tailgate. Free ends of the braces have an aperture therethrough for aligning with the apertures of the first pair of elongated braces for receiving fasteners when the extension panel is in a fully extended orientation.

In these respects, the pick-up truck bed extending device according to the present invention substantially departs from the conventional concepts and designs of the prior art, and in so doing provides an apparatus primarily developed for the purpose of enabling extended loads to be safely and securely hauled.

SUMMARY OF THE INVENTION

In view of the foregoing disadvantages inherent in the known types of tailgate assemblies now present in the prior art, the present invention provides a new pick-up truck bed extending device construction wherein the same can be utilized for enabling extended loads to be safely and securely hauled.

The general purpose of the present invention, which will be described subsequently in greater detail, is to provide a new pick-up truck bed extending device apparatus and method which has many of the advantages of the tailgate assemblies mentioned heretofore and many novel features that result in a new pick-up truck bed extending device which is not anticipated, rendered obvious, suggested, or even implied by any of the prior art tailgate assemblies, either alone or in any combination thereof.

To attain this, the present invention generally comprises a cover member secured to a tailgate of a pick-up truck. The cover member has a generally rectangular configuration defined by a closed inner end, an open outer end, opposed side walls, and a hollow interior. The cover member has a plurality of cross supports secured within the hollow interior thereof. An extension panel is slidably received within the open outer end of the cover member. The extension panel includes an inner panel and an outer panel. An outer edge of the inner panel is hingedly coupled with an inner edge of the outer panel. An outer edge of the outer panel has a pair of L-shaped brackets secured to opposing ends thereof. Each of the brackets have a tab extending downwardly therefrom. A first pair of elongated braces are pivotally coupled with the tabs of the L-shaped brackets of the extension panel. Free ends of the braces have an aperture therethrough. A second pair of elongated braces are pivotally coupled with opposing interior walls of the pick-up inwardly of the tailgate. Free ends of the braces have an aperture therethrough for aligning with the apertures of the first pair of elongated braces for receiving fasteners when the extension panel is in a fully extended orientation.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new pick-up truck bed extending device apparatus and method which has many of the advantages of the tailgate assemblies mentioned heretofore and many novel features that result in a new pick-up truck bed extending device which is not anticipated, rendered obvious, suggested, or even implied by any of the prior art tailgate assemblies, either alone or in any combination thereof.

It is another object of the present invention to provide a new pick-up truck bed extending device which may be easily and efficiently manufactured and marketed.

It is a further object of the present invention to provide a new pick-up truck bed extending device which is of a durable and reliable construction.

An even further object of the present invention is to provide a new pick-up truck bed extending device which is susceptible of a low cost of manufacture with regard to both materials and labor, and which accordingly is then susceptible of low prices of sale to the consuming public, thereby making such pick-up truck bed extending device economically available to the buying public.

Still yet another object of the present invention is to provide a new pick-up truck bed extending device which provides in the apparatuses and methods of the prior art some of the advantages thereof, while simultaneously overcoming some of the disadvantages normally associated therewith.

Still another object of the present invention is to provide a new pick-up truck bed extending device for enabling extended loads to be safely and securely hauled.

Yet another object of the present invention is to provide a new pick-up truck bed extending device which includes a cover member secured to a tailgate of a pick-up truck. An extension panel is slidably received within the open outer end of the cover member. A first pair of elongated braces are pivotally coupled with the extension panel. Free ends of the braces have an aperture therethrough. A second pair of elongated braces are pivotally coupled with opposing interior walls of the pick-up inwardly of the tailgate. Free ends of the braces have an aperture therethrough for aligning with the apertures of the first pair of elongated braces for receiving fasteners when the extension panel is in a fully extended orientation.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a top plan view of the present invention as taken along line 3—3 of FIG. 2.

FIG. 4 is a cross-sectional view of the present invention as taken along line 4—4 of FIG. 3.

DESCRIPTION OF THE PREFERRED EMBODIMENT

Figure 1:
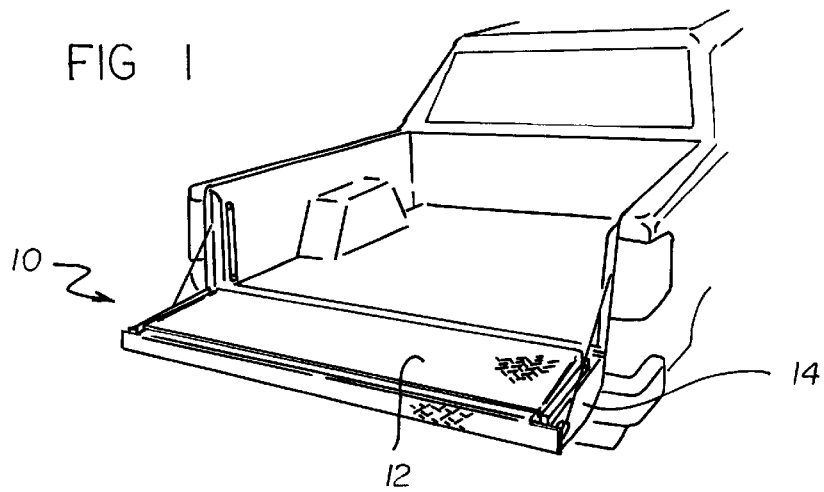
FIG. 1 is a perspective view of a new pick-up truck bed extending device according to the present invention.
Figure 2:
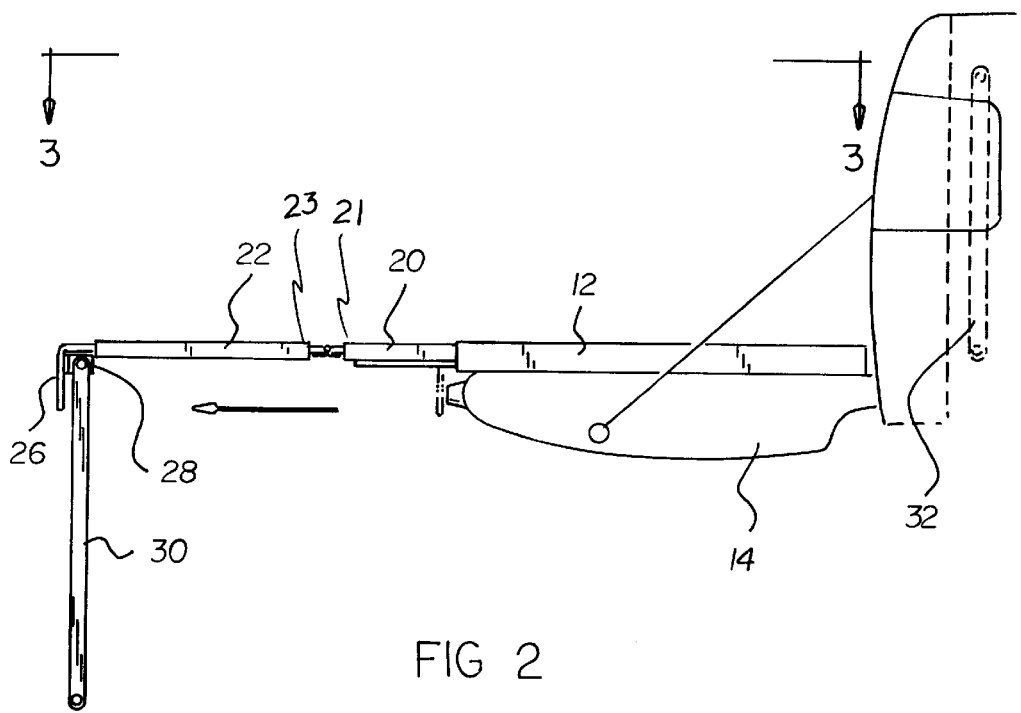
FIG. 2 is a side view of the present invention illustrated in an extended orientation.
Figure 5:
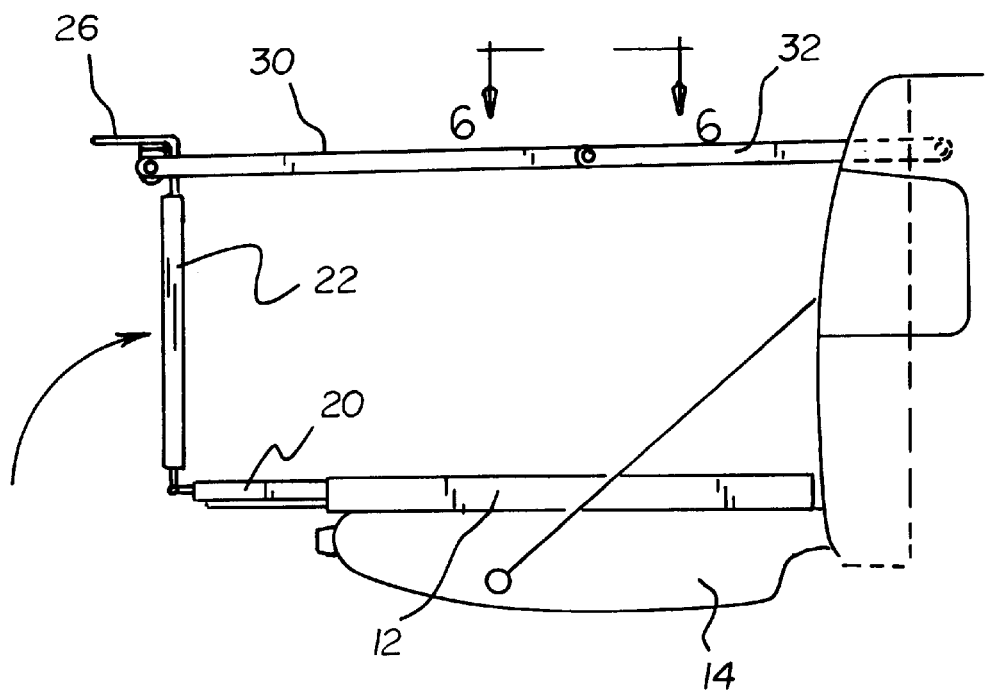
FIG. 5 is a side view of the present invention illustrated in a fully extended and secured orientation.
Figure 6:
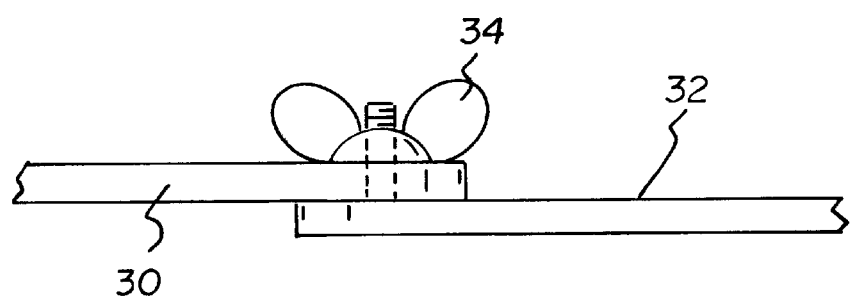
FIG. 6 is a top plan view of the present invention as taken along line 6—6 of FIG. 5.

With reference now to the drawings, and in particular to FIGS. 1 through 6 thereof, a new pick-up truck bed extending device embodying the principles and concepts of the present invention and generally designated by the reference numeral 10 will be described.

As best illustrated in FIGS. 1 through 6, the pick-up truck bed extending device 10 comprises a cover member 12 secured to a tailgate 14 of a pick-up truck. The cover member 12 has a generally rectangular configuration defined by a closed inner end, an open outer end, opposed side walls, and a hollow interior. The cover member 12 has a plurality of cross supports 16 secured within the hollow interior thereof.

An extension panel 18 is slidably received within the open outer end of the cover member 12. The extension panel 18 includes an inner panel 20 and an outer panel 22. An outer edge 21 of the inner panel 20 is hingedly coupled with an inner edge 23 of the outer panel 22. The inner panel 20 has a plurality of extension members 24 extending outwardly from an inner edge thereof for securing to the cross supports 16 of the cover member 12. An outer edge of the outer panel 22 has a pair of L-shaped brackets 26 secured to opposing ends thereof. Each of the brackets 26 have a tab 28 extending downwardly therefrom. The L-shaped brackets 26 also provide a means for pulling the extension panel 18 outwardly from within the cover member 12.

A first pair of elongated braces 30 are pivotally coupled with the tabs 28 of the L-shaped brackets 26 of the extension panel 18. Free ends of the braces 30 have an aperture therethrough.

A second pair of elongated braces 32 are pivotally coupled with opposing interior walls of the pick-up inwardly of the tailgate 14. Free ends of the braces 32 have an aperture therethrough for aligning with the apertures of the first pair of elongated braces 30 for receiving fasteners 34 when the extension panel 18 is in a fully extended orientation.

In use, the tailgate 14 of the pick-up truck is lowered to its horizontal position. Note FIGS. 1 and 2. The extension panel 18 slides outwardly from within the cover member 12. The outer panel 22 is then pivoted upwardly to a position essentially perpendicular to the inner panel 20. The first pair of elongated braces 30 and the second pair of elongated braces 32 are then pivoted towards one another to align the apertures thereof with one another for receiving a fastening member 34. Thus, the secured braces 30, 32 are disposed essentially parallel to the tailgate 12 and the inner panel 20 and the outer panel 22 would be locked in a vertical position.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A pick-up truck bed extending device for enabling extended loads to be safely and securely hauled comprising, in combination:

a cover member secured to a tailgate of a pick-up truck, the cover member having a generally rectangular configuration defined by a closed inner end, an open outer end, opposed side walls, and a hollow interior, the cover member having a plurality of cross supports secured within the hollow interior thereof;

an extension panel slidably received within the open outer end of the cover member, the extension panel including an inner panel and an outer panel, an outer edge of the inner panel being hingedly coupled with an inner edge of the outer panel, the inner panel having a plurality of extension members extending outwardly from an inner edge of the inner panel, an outer edge of the outer panel having a pair of L-shaped brackets secured to opposing ends thereof, each of the brackets having a tab extending downwardly therefrom;

a first pair of elongated braces pivotally coupled with the tabs of the L-shaped brackets of the extension panel, free ends of the braces having an aperture therethrough;

a second pair of elongated braces pivotally coupled with opposing interior walls of the pick-up inwardly of the tailgate, free ends of the braces having an aperture therethrough for aligning with the apertures of the first pair of elongated braces for receiving fasteners when the extension panel is in a fully extended orientation.

2. A pick-up truck bed extending device for enabling extended loads to be safely and securely hauled comprising, in combination:

a cover member secured to a tailgate of a pick-up truck and having an open outer end;

an extension panel slidably received within the open outer end of the cover member;

a first pair of elongated braces pivotally coupled with the extension panel, free ends of the braces having an aperture therethrough;

a second pair of elongated braces pivotally coupled with opposing interior walls of the pick-up inwardly of the tailgate, free ends of the braces having an aperture therethrough for aligning with the apertures of the first pair of elongated braces for receiving fasteners when the extension panel is in a fully extended orientation;

wherein the cover member is defined by a closed inner end, an open outer end, opposed side walls, and a hollow interior, the cover member having a plurality of cross supports secured within the hollow interior thereof; and wherein the extension panel includes an inner panel and an outer panel, an outer edge of the inner panel being hingedly coupled with an inner edge of the outer panel.

3. The pick-up truck bed extending device as set forth in claim 2 wherein the inner panel has a plurality of extension members extending outwardly from an inner edge thereof.

4. The pick-up truck bed extending device as set forth in claim 2 wherein an outer edge of the outer panel has a pair of L-shaped brackets secured to opposing ends thereof, each of the brackets having a tab extending downwardly therefrom.

* * * * *